United States Patent [19]

Anderson et al.

[11] Patent Number: 4,646,965

[45] Date of Patent: Mar. 3, 1987

[54] THERMOSTATIC STEAM TRAP

[75] Inventors: Arthur H. Anderson, Needham; Allan E. MacNicol, Medfield, both of Mass.

[73] Assignee: Bimax Controls, Inc., Medfield, Mass.

[21] Appl. No.: 769,496

[22] Filed: Aug. 26, 1985

[51] Int. Cl.[4] .............................................. F16T 1/04
[52] U.S. Cl. ................................... 236/59; 236/101 E
[58] Field of Search .................. 236/59, 48 R, 101 E, 236/93 R

[56] References Cited

U.S. PATENT DOCUMENTS

| | | | |
|---|---|---|---|
| 1,310,026 | 7/1919 | Lippert | 236/59 |
| 1,656,392 | 1/1928 | Russell et al. | 236/59 |
| 1,681,911 | 8/1928 | Spencer | 236/59 |
| 1,704,848 | 3/1929 | Valmore | 236/59 |
| 1,972,169 | 9/1934 | Spencer | 236/93 R X |
| 2,271,850 | 2/1942 | Zinkil | 236/93 R X |
| 2,764,353 | 9/1956 | Lavallee et al. | 236/59 |
| 4,027,848 | 6/1977 | Mundil | 236/101 E X |
| 4,133,478 | 1/1979 | Place | 236/101 C X |
| 4,140,275 | 2/1979 | Inada | 236/101 E X |
| 4,527,733 | 7/1985 | Anderson | 236/48 R X |

FOREIGN PATENT DOCUMENTS 1142176  1/1963  Fed. Rep. of Germany ........ 236/59

Primary Examiner—William E. Wayner
Attorney, Agent, or Firm—John E. Toupal; Harold G. Jarcho

[57] ABSTRACT

A thermostatic trap for a heating system having a feed pipe connected to a source of steam and a discharge pipe for discharge of condensate. Included in the trap is a housing defining a volume and comprising a bowl shaped body, a removable cover therefor, a housing inlet pipe portion projecting from a side wall portion of the body and adapted for connection to the discharge pipe, a housing outlet pipe portion projecting from a bottom wall portion of the body, and an outlet orifice defined by the bottom wall portion and extending between the volume and the outlet pipe portion. Retained within the volume is a valve body means comprising an end wall, a side wall and a retaining ring portion that together define a valve chamber, the end wall defining a valve inlet opening communicating with the chamber and an annular valve seat within the chamber and encircling the valve inlet opening. The valve body means defines a valve outlet pipe opening into the chamber and retained in the outlet orifice. Disposed within the valve chamber and encircling the valve inlet opening is a resilient, annular seal. A bi-metallic disc within the valve chamber has an outer peripheral portion retained by the retaining ring portion of the valve body means, the disc being substantially parallel to the valve seat and in a normal position spaced therefrom by a distance greater than the thickness of said annular seal means.

11 Claims, 5 Drawing Figures

THERMOSTATIC STEAM TRAP

BACKGROUND OF THE INVENTION

This invention relates in general to thermostatic steam traps for two pipe steam heating systems and, more particularly, to such a trap emplyoing a valve with a bi-metalic actuator.

Although extensively used, thermostatically steam trapped radiator systems have certain disadvantages. For example, failures of the thermostatic steam traps used in such systems are quite common and result in substantial reductions in heating efficiency. Generally, faulty traps are diagnosed with infrared equipment that make distinctions between operating temperatures of about 190° and 210° F. However, even after a given trap has been accurately diagnosed as faulty the repair thereof is a costly process in that replacement traps are relatively expensive.

The object of this invention, therefore, is to provide an improved steam heating system that employs less costly and more efficient thermostatic steam traps.

SUMMARY OF THE INVENTION

The invention is a thermostatic trap for a heating system having a feed pipe connected to a source of steam and a discharge pipe for discharge of condensate. Included in the trap is a housing defining a volume and comprising a bowl shaped body, a removable cover therefor, a housing inlet pipe portion projecting from a side wall portion of the body and adapted for connection to the discharge pipe, a housing outlet pipe portion projectirg from a bottom wall portion of the body, and an outlet orifice defined by the bottom wall portion and extending between the volume and the outlet pipe portion. Retained within the volume is a valve body means comprising an end wall, a side wall and a retaining ring portion that together define a valve chamber, the end wall defining a valve inlet opening communicating with the chamber and an annular valve seat within the chamber and encircling the valve inlet opening. The valve body means defines a valve outlet pipe opening into the chamber and retained in the outlet orifice. Disposed within the valve chamber and encircling the valve inlet opening is a resilient, annular seal. A bi-metalic disc within the valve chamber has an outer peripheral portion retained by the retaining ring portion of the valve body means, the disc being substantially parallel to the valve seat and in a normal position spaced therefrom by a distance greater than the thickness of said annular seal means. In response to a predetermined ambient temperature the disc deflects concavely into fluid sealing engagement with one end of the annular seal, an opposite end thereof being in fluid sealing engagement with the valve seat so as to isolate the valve inlet from the outlet orifice, and in response to a given ambient temperature substantially different from the predetermined ambient temperature the disc deflects back into its normal position to provide a communication path between the valve inlet and the outlet orifice.

According to certain features of the invention, the valve body means comprises a cup-shaped base including the valve outlet pipe and a valve cap retained in an open end of the base and defining the end wall, the side wall and the retaining ring portion, the side wall is a cylinder extending between the end wall and a bottom surface of the base, and the retaining ring portion is defired by an internal counterbore in the cylindrical side wall and the bottom surface of the base. This arrangement provides an efficient, compact valve assembly suitable for retrofitting in existing steam trap bodies.

According to another feature of the invention, the outlet pipe defines a non-circular opening facing said disc. The non-circular opening prevents complete closure thereof by the disc in its normal position.

According to still another feature of the invention, the peripheral portion of the disc is loosely retained by the retaining ring portion. Loose retention enhances the functional utility of the disc.

According to yet another feature of the invention, the disc deflects toward the valve inlet in response to the predetermined ambient temperature. This feature insures that any failure of the valve will occur in an open condition.

Accordirg to other features of the invention the predetermined ambient temperature is in a range between 190°–210° F. and the given temperature is in a range between 165°–175° F. These temperatures render the tray suitable for conventional steam heating systems.

DESCRIPTION OF THE DRAWINGS

These and other objects and features of the invention will become more apparent upon a perusal of the following description taken in conjunction with the accompanying drawings wherein:

FIG. 1 shows a conventional steam radiator 12 for a two-pipe vapor system. The radiator has a steam feed pipe 14 and a discharge pipe 16. Steam from a boiler (not shown) is carried by mains, branches and risers (not shown) to a number of radiators 12 distributed throughout the structure being heated. Typically each room of the structure has at least one associated radiator 12. When a central thermostat or thermostats (not shown) activate a release of steam from the boiler, the steam flows into the feed pipe 14 of each radiator, through each section of the radiator ard the discharge pipe 16 to a steam trap 18. The thermostatically controlled trap 18 closes the outlet 16 to retain steam being supplied by the boiler and resulting in the radiation of heat from the radiator 12. Shortly after a central thermostat has deactivated the boiler, the trap 18 opens the discharge pipe 16 allowing the residual fluid content of the radiator 12 to empty into a return main that carries condensed water back to the boiler.

Illustrated in FIGS. 2–5 are details of the thermostatically controlled trap 18. A housing of the trap 18 includes a bowl shaped body 15 and a removable cover 17. Projecting from a side wall of the body 15 is an externally threaded inlet pipe portion 19 connected to the discharge pipe 16. An internally threaded outlet pipe portion 20 projects from a bottom wall of the body 15. Defined by the bottom wall of the body 15 is a threaded outlet orifice 21 extending between the outlet pipe portion 20 and a volume 22 defined by the trap 18. As shown in FIGS. 2 and 3 the trap 18 retains a temperature controlled valve 25 that controls fluid flow between the inlet pipe portion 19 and the outlet pipe portion 20. The valve 25 includes a cup-shaped base 23 and a valve cap 24 friction fitted into the open end of the base 23. Extending fron the bottom of the base 23 is a centrally positioned, externally threaded valve outlet pipe 26 that is retained in the outlet orifice 21. The valve cap 24 includes an end wall 27 and a cylindrical side wall 28 projecting into the base 23 and engaging a bottom surface thereof. Centrally defined in the end wall 27 is a valve inlet opening 29 while circumferentially spaced apart, radially directed valve passages 31 are defined by the cylindrical side wall 28. An internal counterbore in the cylindrical side wall 28 defines an internal annular shoulder 30 (FIG. 4) that forms therewith an annular recess 34. Loosely retained in the annular recess 34 is the periphery of a bi-metalic disc 35. The disc 35 and the valve body 23, 24 form a valve chamber 36.

Disposed within the valve chamber 36 is a resilient O-ring 45 formed, for example, of silicone. The O-ring 45 encircles the valve inlet opening 29 and has one end 47 directly adjacent an annular valve seat 48 formed by an inner surface portion of the end wall 27. An opposite end 49 of the O-ring 45 is disposed directly adjacent to the bi-metalic disc 35. As shown in FIGS. 2 and 4 the thickness of the O-ring 45 defined by its ends 47 and 49 is less than the normal spacing between the valve seat 48 and the bi-metalic disc 35. Also the outer diameter of the O-ring 45 is slightly less than the inner diameter of the cylindrical side-wall 28. Thus, in the open position shown in FIG. 2 there exist between the valve inlet 29 and the valve outlet pipe 26 flow possages between the O-ring 45 and, respectively, the valve seat 48, the bimetalic disc 35 and the inner surface of the cylindrical side wall 28. To prevent closure of the outlet pipe 26 by the disc 35, the opening 50 into the pipe 26 has a noncircular, preferably, hexagonal form. It should be understood that these clearances are slightly exaggerated in FIGS. 2 and 3 for purposes of clarity.

Figure 1:
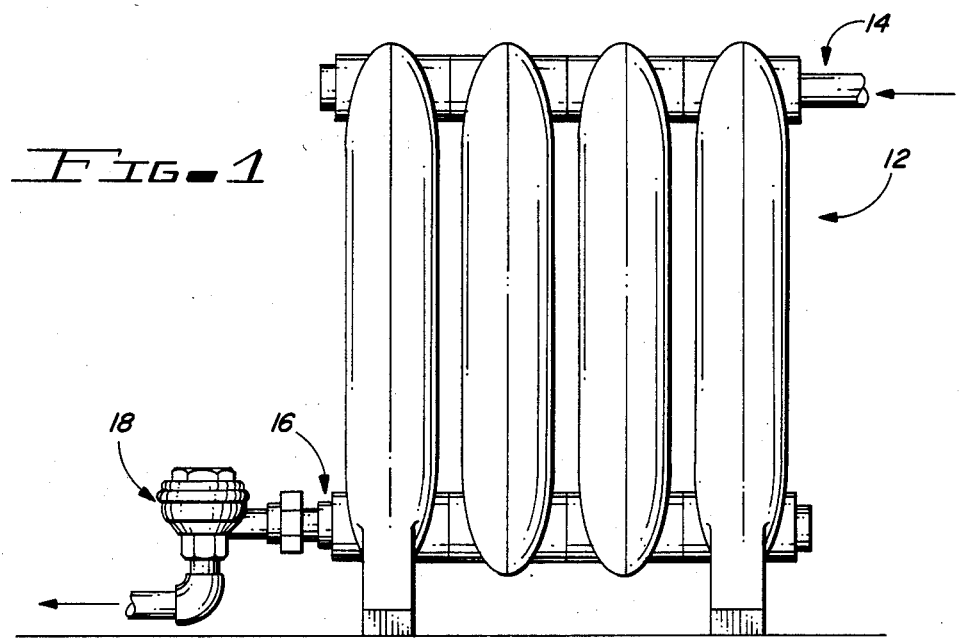
FIG. 1 is a view in front elevation of a steam heating radiator system according to the invention.
Figure 4:
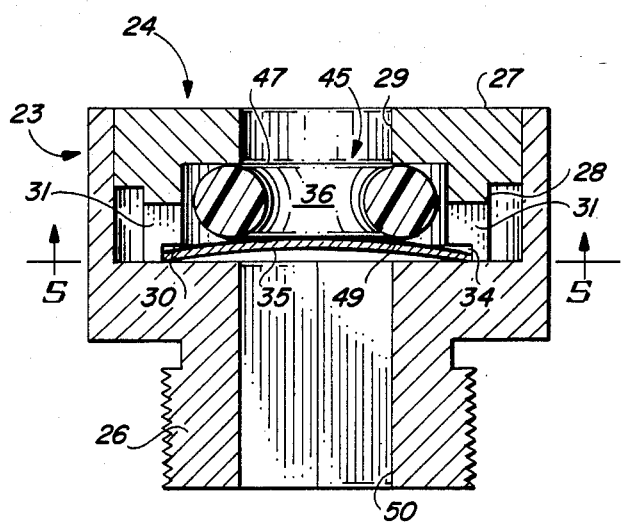
FIG. 4 is a schematic cross sectional view of the valve shown in FIG. 2 in a closed position.
Figure 5:
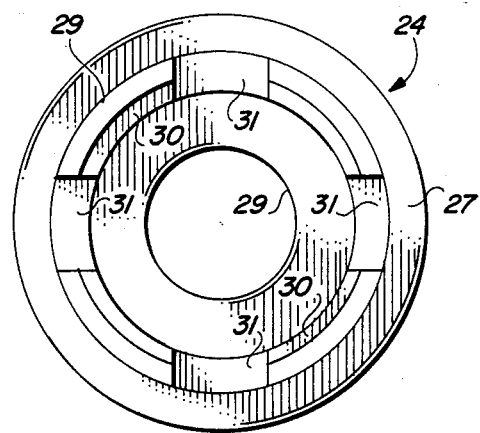
FIG. 5 is a schematic bottom view of a valve insert shown in FIGS. 2 and 3. cl DESCRIPTION OF THE PREFERRED EMBODIMENT

In response to a predetermined ambient temperature, the bi-metalic disc 35 deflects concavely toward the valve inlet 29 and into the valve chamber 36 as shown in FIG. 4. The deflected disc 35 sealingly engages the end 49 of the O-ring 45 and forces the opposite end 47 thereof into sealing engagement with the valve seat 48. Thus, fluid flow is prevented between the valve inlet 29 and the valve pipe 26. In response to a subsequent reduction in ambient temperature, the bi-metalic disc 35 returns to its orlginal open position shown in FIG. 2 and again allows fluid flow between the valve inlet 29 and the valve outlet pipe 26.

OPERATION

Figure 2:
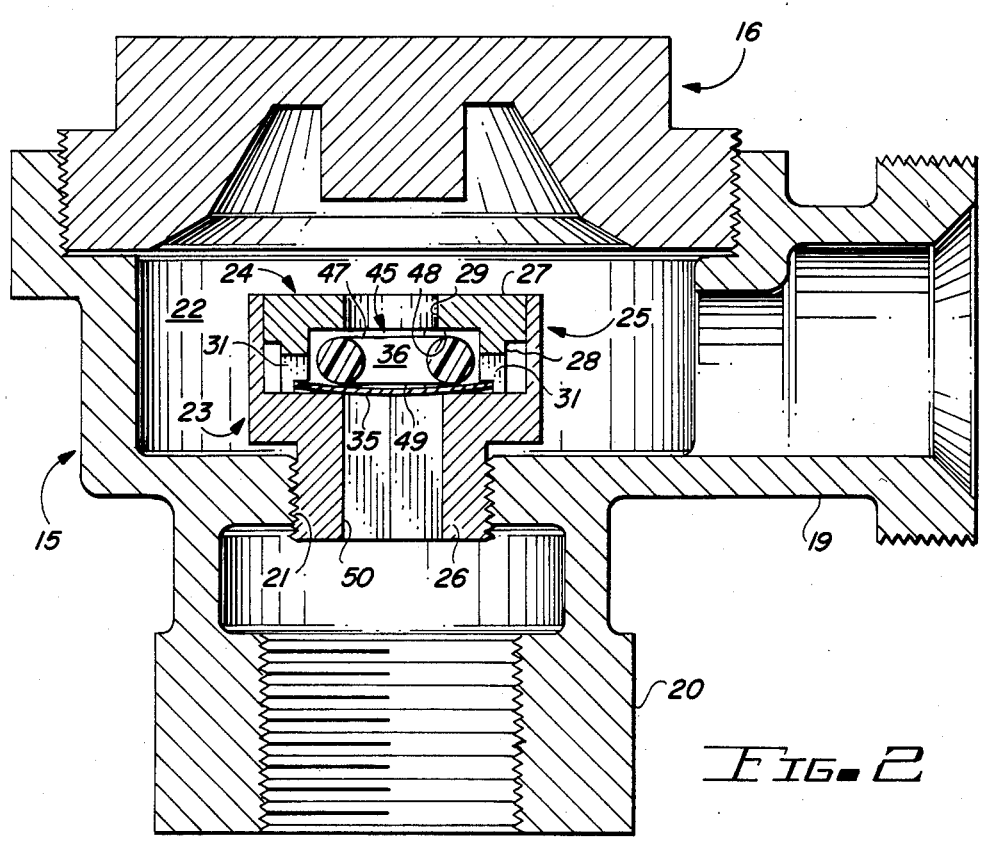
FIG. 2 is a schematic cross sectional view taken through the steam trap shown in FIG. 1 with a valve in an open position.
Figure 3:
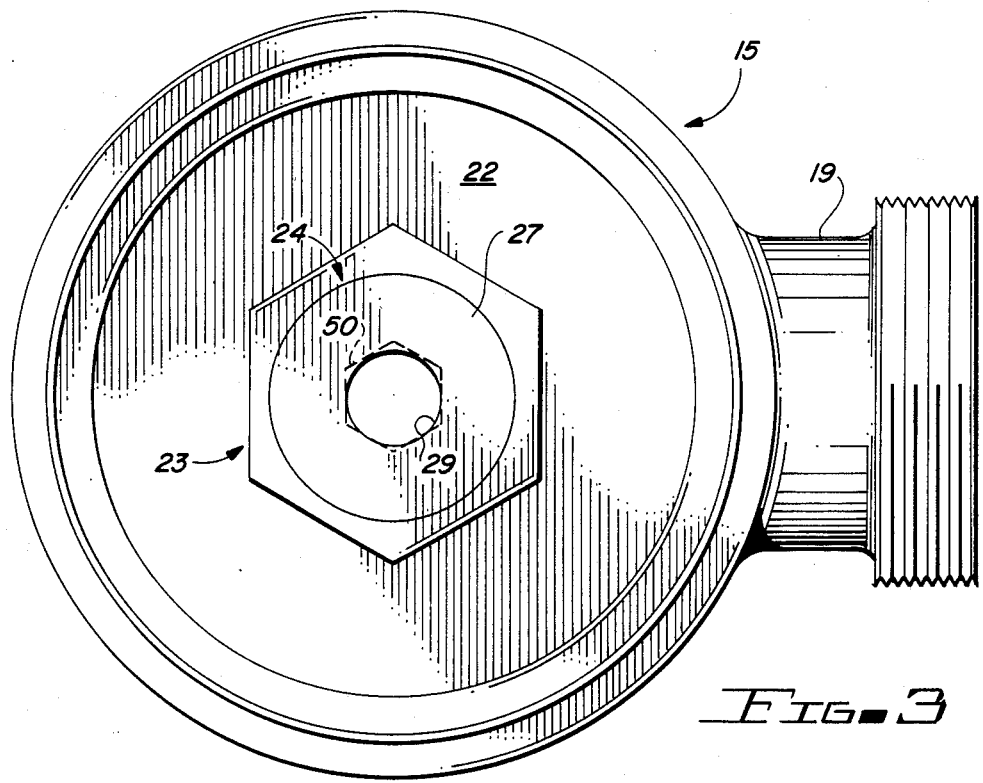
FIG. 3 is a schematic top view of the steam trap shown in FIG. 2 with its cover removed.

When steam is supplied by a boiler to the radiator 12, the bi-metalic disc 35 quickly reaches a predetermined activation temperature, preferably between 190°-210° F., and deflects inwardly to close the valve 25. Thus, steam is retained by the radiator 12 resulting in radiation of heat therefrom. Some time after the supply of steam to the radiator 12 has terminated, the ambient temperature of the disc 35 will fall to a given return temperature, preferably of about 170° F. The resultant return of the bi-metalic disc 35 to its undeflected position reopens the valve 25 allowing a discharge of the residual fluid within the radiator 12. That fluid, primarily condensate, passes through the steam trap 18 to a return main (not shown). It will be noted that high temperature activation deflects the bi-metalic disc 35 toward the valve inlet 29 as shown in FIG. 4. Thus, steam pressure in the volume 22 exerts a force tending to return the disc 35 to a return position that opens the valve 25 as shown in FIG. 2. Consequently, any failure of the disc 35 will normally create a condition in which the valve 25 remains open rather than closed. That factor is important in that a failure of the valve 25 to open will prevent discharge from the radiator 12 of condensate which will in turn create a liquid seal that prevents subsequent entry of steam thereby rendering the radiator substantially dysfunctional.

Obviously, many modifications and variations of the present invention are possible in light of the above teachings. It is to be understood, therefore, that the invention can be practiced otherwise than as specifically described.

What is claimed:

1. A thermostatic trap for a heating system having a feed pipe connected to a source of steam and a discharge pipe for discharge of condensate and comprising:

housing means defining a volume and comprising a bowl shaped body, a removable cover therefor, a housing inlet pipe portion projecting from a side wall portion of said body and adapted for connection to the discharge pipe, a housing outlet pipe portion projecting from a bottom wall portion of said body, and an outlet orifice defined by said bottom wall portion and extending between said volume and said outlet pipe portion;

a valve body means retained within said volume and comprising an end wall, a side wall and a retaining ring portion that together define a valve chamber, said end wall defining a valve inlet opening communicating with said chamber and an annular valve seat within said chamber and encircling said valve inlet opening, said valve body means comprising a valve outlet pipe that defines a valve outlet opening axially aligned with said valve inlet opening and communicating with said chamber, said outlet pipe being fixed in said outlet orifice;

a resilient, annular seal means disposed within said valve chamber and encircling said valve inlet opening; and a bi-metalic disc disposed within said valve chamber between said annular seal means and said outlet opening and having an outer peripheral portion retained by said retaining ring portion of said valve body means, said disc being substantially parallel to said valve seat and in a normal position spaced therefrom by a distance greater than the thickness of said annular seal means; and wherein said disc responds to a predetermined ambient temperature by deflecting concavely into fluid sealing engagement with one end of said annular seal means, an opposite end thereof being in fluid sealing engagement with said valve seat so as to isolate said valve inlet opening from said outlet orifice, and said disc responds to a given ambient temperature substantially different from said predetermined ambient temperature by deflecting back into said normal position to provide a communication path between said valve inlet and said outlet orifice.

2. A thermostatic trap according to claim 1 wherein said valve body means comprises a cup-shaped base including said valve outlet pipe and a valve cap retained in an open end of said base and defining said end wall, said side wall and said retaining ring portion.

3. A thermostatic trap according to claim 2 wherein said side wall is a cylinder extending between said end wall and a bottom surface of said base.

4. A thermostatic trap according to claim 3 wherein said retaining ring portion is defined by an internal counterbore in said cylindrical side wall and said bottom surface of said base.

5. A thermostatic trap according to claim 4 wherein said valve outlet pipe defines a non-circular opening facing said disc.

6. A thermostatic trap according to claim 5 wherein said side wall defines a plurality of apertures opening into said valve chamber.

7. A thermostatic trap according to claim 6 wherein said peripheral portion is loosely retained by said retaining ring portion.

8. A thermostatic trap according to claim 7 wherein said disc deflects toward said valve inlet in response to said predetermined ambient temperature.

9. A thermostatic trap according to claim 8 wherein said predetermined ambient temperature is greater than said given ambient temperature.

10. A thermostatic trap according to claim 9 wherein said valve outlet pipe and said outlet orifice are threadedly engaged.

11. A thermostatic trap according to claim 10 wherein said predetermined ambient temperature is in a range between 190°–210° F. and said given ambient temperature is in a range between 165°–175° F.

* * * * *